A. URBSCHEIT.
SPIRAL DRILL.
APPLICATION FILED DEC. 10, 1908.

932,071. Patented Aug. 24, 1909.

Witnesses:
C. H. Crawford
E. Schallinger

Inventor Alfred Urbscheit
By B. Singer
Attorney

UNITED STATES PATENT OFFICE.

ALFRED URBSCHEIT, OF BERLIN, GERMANY, ASSIGNOR TO ARTHUR HAENDLER, OF BERLIN, GERMANY.

SPIRAL DRILL.

932,071.   Specification of Letters Patent.   Patented Aug. 24, 1909.

Application filed December 10, 1908.  Serial No. 466,834.

*To all whom it may concern:*

Be it known that I, ALFRED URBSCHEIT, a subject of the German Emperor, and residing at Berlin, Germany, have invented certain new and useful Improvements in Spiral Drills, of which the following is a specification.

The subject-matter of the present invention is an improved spiral drill which is particularly suitable for high-speed drilling.

Known spiral drills consisting of so-called high-speed steel are very expensive and have the disadvantage that the parts which do not participate directly in the drilling also have to be made of the expensive high-speed steel.

A primary object of the present invention is to remedy these defects, and in accordance with the invention the real drilling part of the spiral drill is made of high-speed steel, as defined hereinafter, and the other part of ordinary cast-steel and not of high-speed steel. Preferably the parts of the drill are of such size that the drilling part which is made of high-speed steel forms one-third and the non-drilling part makes up two-thirds of the whole tool.

Figure 1:
Figure 2:
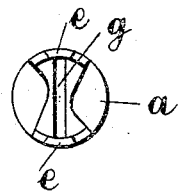
Figure 3:
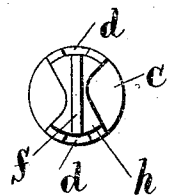
Figure 4:
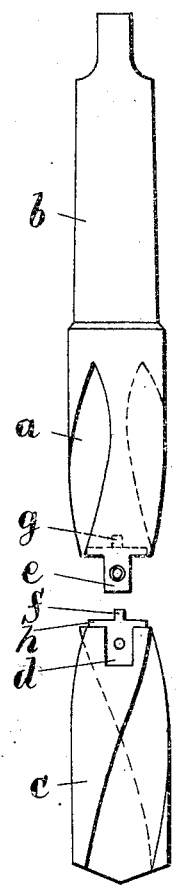

In order that the invention may be clearly understood reference will be made to the accompanying drawing in which one form of spiral drill is represented by way of example, and in which:

Figure 1 is an elevation, and Figs. 2 and 3 are bottom and top plan views respectively of the superimposed ends of the two parts comprising the drill, whereas Fig. 4 is a side elevation of the drill, its two parts being shown separated.

As clearly shown in the drawing, in the constructional form represented the drill is divided in the part which is provided with spiral grooves and consists of the top part $a$, which is connected with the preferably conical shaft $b$, and the bottom part $c$ which is the drilling part proper. In the form represented the two parts $a$ and $c$ are connected by several members which engage one another in such manner that the two parts $a$ and $c$ fit and can be permanently held perfectly concentrically one on the other. For this purpose the part $c$ is provided with lateral incisions $d$, in which shoulders or projections $e$ of the top part $a$ engage. Into these projections screws $i$ are inserted and screwed into the part $c$. The latter has at its upper end a cylindrical shoulder $h$ which fits into a cylindrical cavity in the top part $a$. The cylindrical shoulder $h$ of the part $c$ has an elongated projection, for example a tang $f$, which can be placed into a groove $g$ in the upper part $a$.

The tang $f$ may be made independently of the part $a$ or $c$ and instead of its being rigidly connected with the part $c$ it may be let into a groove in the same.

The assembled spiral drill is equal to the spiral drill made out of one piece of high-speed steel with regard to its capacity for doing work and by far excels it in adaptability and readiness for work, since, as will be readily understood, the drill according to the present invention is much more handy for grinding than known constructional forms and can also be more easily replaced.

By high-speed steel in the sense in which the term is used in the present specification and claims all kinds of steel are to be understood which must be heated to a temperature higher than 1000° C. for the purpose of hardening them, whereas by ordinary cast-steel all kinds of steel are to be understood which are not suitable for use as high-speed steel.

What I claim as my invention and desire to secure by Letters Patent is:

1. In a spiral drill, the combination of a top part with a bottom part, one of said parts having a central cavity at its end, the other part having a central projection at its end adapted to engage said cavity in the opposite part, lateral members fitting into lateral incisions of the drill and means for holding said members in said incisions and the said two parts together, as set forth.

2. In a spiral drill, the combination of a top part with a bottom part, one of said parts having a central cavity at its end, the other part having a central projection at its end adapted to engage said cavity in the opposite part, a tang at the end of one of said parts fitting into a groove in the end of the opposite part and means for holding the two parts together.

In witness whereof I have set my hand hereunto in the presence of two subscribing witnesses.

ALFRED URBSCHEIT.

Witnesses:
  WOLDEMAR HAUPT,
  HENRY HASPER.